United States Patent [19]

Federman

[11] Patent Number: 5,412,699
[45] Date of Patent: May 2, 1995

[54] BRAKE TOOL FOR TRANSVERSING INCORE PROBE

[75] Inventor: Glenn Federman, Adams, N.Y.

[73] Assignee: Niagara Mohawk Power Corporation, Syracuse, N.Y.

[21] Appl. No.: 163,294

[22] Filed: Dec. 7, 1993

[51] Int. Cl.6 .............................................. G21C 19/00
[52] U.S. Cl. .................................... 376/260; 376/254; 188/72.7; 242/156
[58] Field of Search ...................... 376/245, 254, 260; 188/71.1, 72.7, 83; 242/75.4, 156

[56] References Cited

U.S. PATENT DOCUMENTS

| | | | |
|---|---|---|---|
| 3,731,768 | 5/1973 | Fetzer | 188/75 |
| 4,351,417 | 9/1982 | Seiz et al. | 188/65.1 |
| 4,454,933 | 6/1984 | Hunnicutt et al. | 188/72.7 |

Primary Examiner—Daniel D. Wasil
Attorney, Agent, or Firm—Lalos & Keegan

[57] ABSTRACT

In a transversing incore probe system including a probe connected to a helix cable that is advanced into a drive assembly and is kept under high tension by a spring biased reel, a safety device is provided by a brake tool including a clamping assembly for clamping the brake tool in a fixed position relative to the reel, a head connected to the clamping assembly for releasable engagement with an outside circumferential surface of the reel, and a threaded shaft connected to the head and received within the clamping assembly for advancing the head toward and withdrawing the head from the reel.

10 Claims, 2 Drawing Sheets

BRAKE TOOL FOR TRANSVERSING INCORE PROBE

FIELD OF THE INVENTION

The subject invention is related to safety devices for use in the nuclear industry. More particularly, the present invention is related to a safety device to be used in a transversing incore probe system.

BACKGROUND OF THE INVENTION

Transversing incore probes (TIPs) are used in the nuclear power industry to calibrate local power range detectors that are located within the housing of a nuclear reactor. The TIP system includes a probe, such as a gamma detector or a neutron detector, fixed on the end of a helix cable. In operation, the helix cable is driven into the reactor core and the probe is moved next to the local power range detector that requires calibration. The helix cable is drawn off a large reel (known as a Gleason reel) on which it is wound. The Gleason reel maintains the helix cable under high tension by means of a spring and acts to draw the helix cable out from the reactor housing. The helix cable is driven through a protective tubing into the reactor housing by a motor connected to a drive chain, which in turn is connected to a gear box connected to a drive shaft that is connected to a drive wheel. The drive wheel (known as a hob wheel) is notched to drivingly engage the helix cable.

Periodically, the torque on the helix cable is measured to ensure that it is not binding within the protective tubing. Such binding can occur for various reasons, including accidental crimping of the protective tubing. A set procedure is used for measuring the torque. First, a C-clamp is placed on the Gleason reel and secured against its housing to prevent the reel from moving and retracting the helix cable. Once the Gleason reel is locked in position, a master link on the drive chain is disconnected and the drive chain is pulled off. Finally, a hand crank and torque wrench are placed on the drive shaft, the C-clamp is removed from the Gleason reel and the torque is measured.

A problem that is encountered during such torque measuring procedure is that during hand cranking, the handle can fall off which enables the Gleason reel to retract the probe. If the probe is withdrawn from the core it may expose personnel to radiation as the probe tip can be very hot depending on where it was located in the core and the amount of time it was located therein.

SUMMARY OF THE INVENTION

The present invention solves the problems encountered in the prior art by providing an effective and efficient brake for the Gleason reel. The brake of the present invention obviates the need for and use of the C-clamp in the prior art procedure by providing a retractable head for engagement with the Gleason reel. A handle and lever arm extend and retract a threaded shaft through a clamp mounted on or in proximity to the Gleason reel. As the shaft is advanced, it forces the brake head to engage the reel and prevent it from moving and retracting the helix cable and probe. To measure the torque, the brake handle and lever arm are rotated in the opposite direction to withdraw the shaft and move the brake head away from the Gleason reel. In an emergency situation in which the reel begins to retract the helix cable and probe, the brake handle and lever arm can be quickly turned to engage the brake head with the Gleason reel and quickly stop its movement. This ability greatly enhances the safety of technical personnel during torque measuring operations.

DETAILED DESCRIPTION

Figure 1:
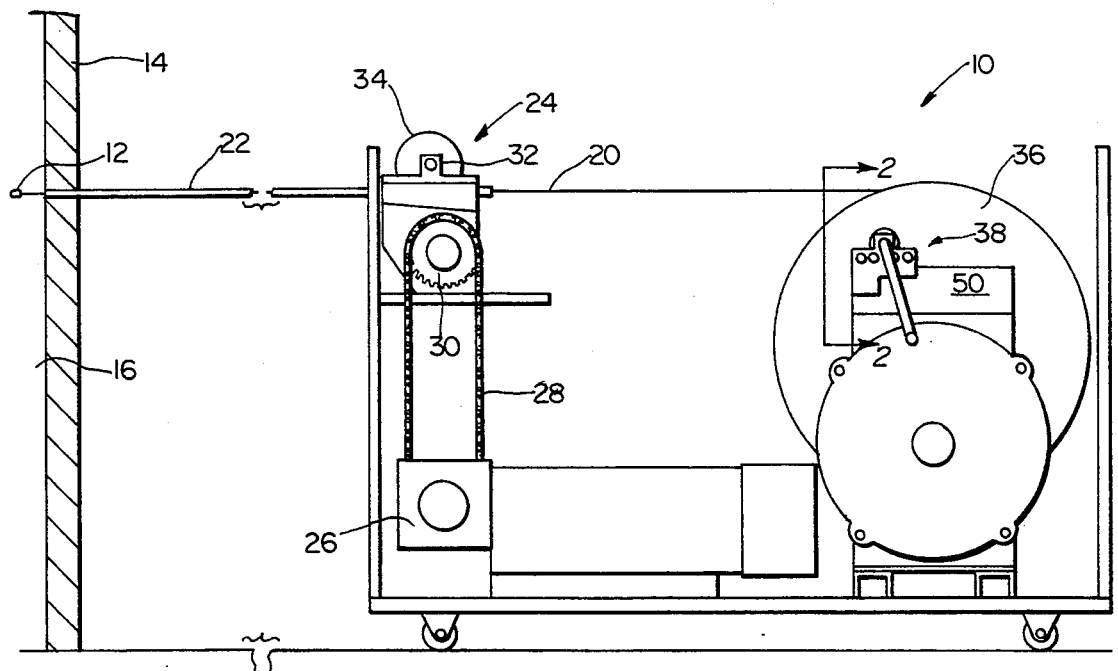
FIG. 1 is a perspective view of a transversing incore probe (TIP) system using the brake tool of the present invention.

The transversing incore probe system is designated generally as 10 in FIG. 1. The probe 12, which may be for example a gamma or neutron detector, is extended transversely through the wall 14 of reactor 16. It is located next to the local power range detector (not shown) that requires calibration. Probe 12 is attached on the end of helix cable 20 that is driven into and out of the reactor through protective tubing 22. The helix cable drive apparatus is shown generally at 24. It includes a drive motor 26, connected to a drive chain 28 that is in turn connected to gear box 30. Gear box 30 will drive shaft 32 of wheel 34. Wheel 34 (known as a hob wheel) is provided with notches to drivingly engage helix cable 20 for movement into or out of reactor 16.

Helix cable 20 is maintained under high tension by reel 36 upon which cable 20 is wound. Reel 36 is biased by an internal spring and is commonly known as a Gleason reel. The torque produced in reel 36 by its internal spring acts against the force of drive assembly 24 to withdraw the helix cable 20 from reactor 16. As previously discussed, during torque measurement procedures on helix cable 20, the driving force of assembly 24 is effectively replaced by a hand crank and a connected torque wrench. If such hand crank comes off during the measuring procedure, reel 36 will act to withdraw probe 12 quickly and such withdrawal may expose personnel to risk. Brake tool assembly 38 provides a quick acting positive stop to lock reel 36 from movement and thereby prevent unintentional withdrawal of probe 12.

Figure 2:
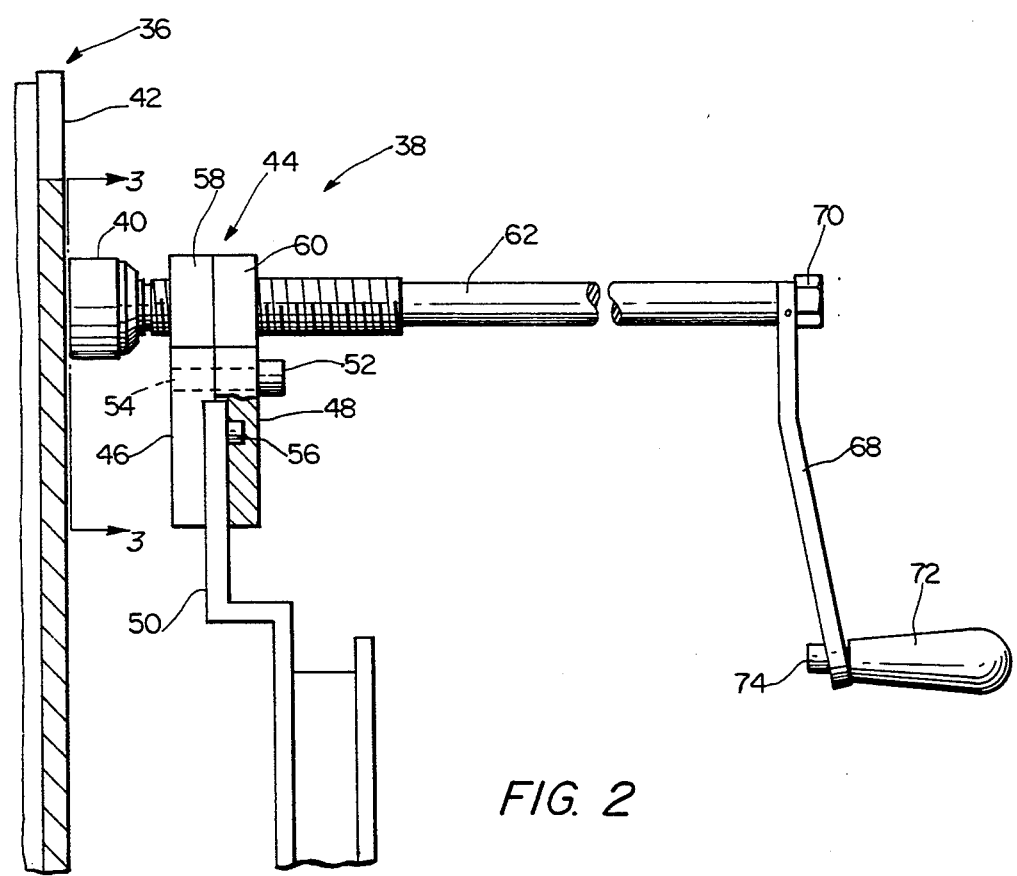
FIG. 2 is a perspective side view of the brake tool of the present invention taken along the lines 2—2 of FIG. 1.
Figure 3:
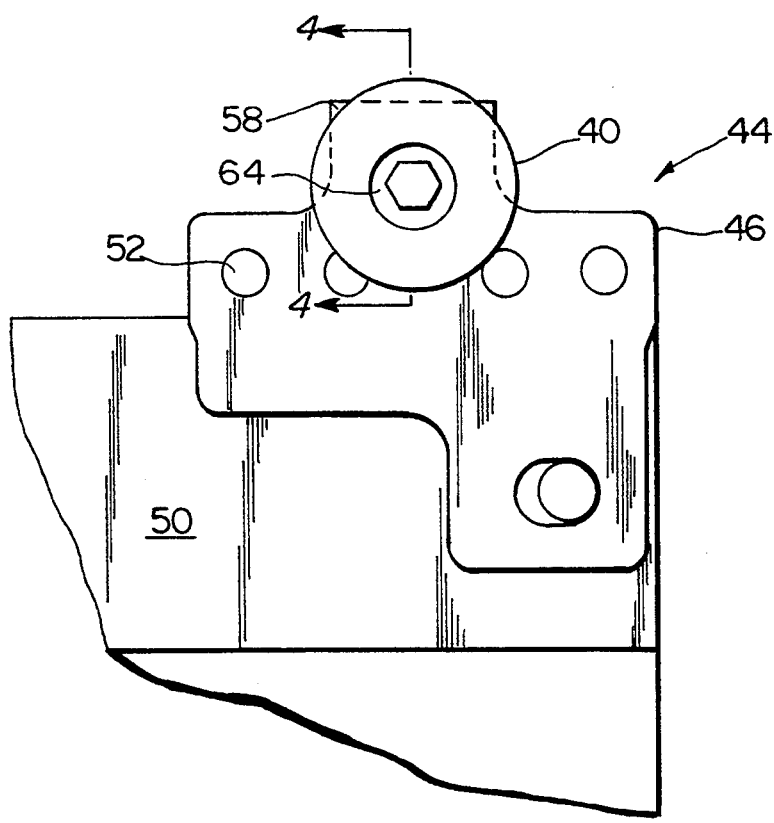
FIG. 3 is a perspective end view of the brake tool of the present invention taken along the lines 3—3 of FIG. 2.

Referring to FIG. 2, brake tool assembly 38 is shown in greater detail. It includes a head made of any suitable material, including hard plastic materials such as polyamides (nylon). The balance of the assembly is made of any suitable material but in the preferred embodiment is carbon steel. Head 40 is intended to engage and provide a positive stop against outer circumferential surface 42 of reel 36. Brake assembly 38 is secured in place relative to reel 36 by clamp assembly 44. Clamp assembly 44 includes two clamp members 46 and 48 that are secured to one another about support structure 50 by Allenhead screws 52 that pass through cooperating threaded holes 54 in clamp members 46 and 48. The right-angled shape of clamp assembly 44 can best be seen in the end view of FIG. 3. Lower set screws 56 (FIG. 2) are provided such that when they are advanced within cooperating threaded holes in clamp member 48, they impinge upon support structure 50 to assist in securing the clamp assembly to the support structure. Support structure 50 may be any suitable structure that is in a fixed position relative to reel 36 and proximate to reel 36 as shown in FIG. 1.

Figure 4:
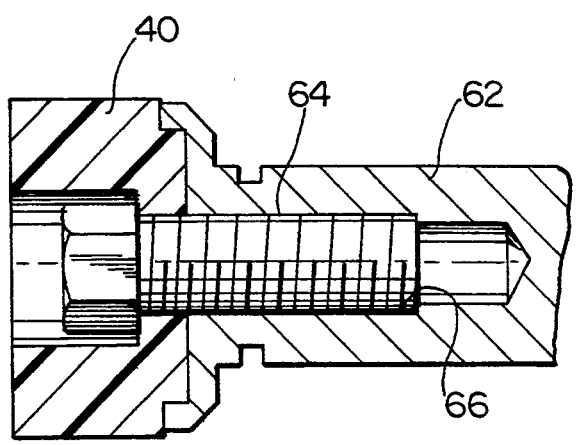
FIG. 4 is a cross-sectional view of a portion of the brake tool of the present invention taken along the lines 4—4 of FIG. 3.

Clamp members 46 and 48 are each provided with aligned threaded openings in their respective neck portions 58 and 60 through which a correspondingly threaded shaft 62 passes (FIG. 2). As best seen in FIG. 4, head 40 is attached to shaft 62 by a threaded screw 64 that cooperatively engages a corresponding threaded hole 66 in shaft 62. As will be readily appreciated with reference to FIG. 2, as shaft 62 is rotated in a clockwise direction head 40 is advanced in the direction of outside circumferential surface 42 of reel 36 until it reaches a point of direct contact. As shaft 62 is rotated in a counterclockwise direction, head 40 will be withdrawn from reel 36. Attached at the distal end of shaft 62 from head 40 is lever arm 68. Arm 68 can be attached by any suitable means, including screw 70 that screws into shaft 62. Attached at the distal end of arm 68 from shaft 62 is handle 72, which may be attached in any suitable manner, including for example compression fit of handle extension 74 into a cooperating hole in arm 68.

Again, as will be readily appreciated from the drawings, movement of handle 72 in a clockwise direction causes lever arm 68 to turn shaft 62 in a clockwise direction to thereby advance head 40 toward and against surface 42 of reel 36. The torque provided by lever arm 68 and the rotative force applied to handle 72 translate into significant transverse force applied to head 40 and against reel 36. The brake tool 38 thereby provides an effective and simply operated stop against movement of reel 36 in the case of an emergency and an effective release of reel 36 during the torque measuring procedure.

From the foregoing detailed description, it will be appreciated that the brake tool of the present invention provides a unique safety feature for use not only in the nuclear industry but wherever an effective and easy to use releasable stop is needed to prevent the rotative movement of a reel. Adaptations of the present invention, which will be apparent to those having ordinary skill in the art, are intended to be within the scope of the present invention as defined by the following claims.

I claim:

1. In a transversing incore probe system including a probe connected to a helix cable that is advanced into a reactor by a drive assembly and is kept under high tension by a spring biased reel, a brake tool comprising:
    a clamping means for maintaining said brake tool in a fixed position relative to said reel;
    a head connected to said clamping means for releasably engaging an outside circumferential surface of said reel; and
    a means for advancing said head toward and withdrawing said head from said outside circumferential surface to stop movement of said reel and permit movement of said reel, respectively.

2. A brake tool as in claim 1 wherein said means for advancing said head includes a threaded shaft attached on one end to said head.

3. A brake tool as in claim 2 wherein said head is connected to said clamping means by said threaded shaft and said clamping means includes a threaded hole for receiving said threaded shaft.

4. A brake tool as in claim 2 wherein said means for advancing said head includes a lever arm connected to said threaded shaft at a distal end from said head.

5. A brake tool as in claim 4 wherein said means for advancing said head includes a handle attached to said lever arm at a distal end from said threaded shaft.

6. A brake tool as in claim 1 wherein said clamping means includes two clamp members for receiving a support structure therebetween.

7. A brake tool as in claim 6 wherein one of said two clamp members includes set screws for engagement with said support structure to inhibit relative movement between said clamping means and said support structure.

8. A brake tool as in claim 1 wherein said head is made of plastic.

9. A brake tool as in claim 1 wherein said head is made of nylon.

10. A brake tool as in claim 1 wherein said clamping means and said advancing means are made of steel.

* * * * *

UNITED STATES PATENT AND TRADEMARK OFFICE
CERTIFICATE OF CORRECTION

PATENT NO. : 5,412,699
DATED : May 2, 1995
INVENTOR(S) : Glenn Federman

It is certified that error appears in the above-identified patent and that said Letters Patent is hereby corrected as shown below:

In Claim 1, col. 4, lines 14 to 15, please delete "circumferential".

Signed and Sealed this

Twenty-seventh Day of June, 1995

Attest:

BRUCE LEHMAN

Attesting Officer

Commissioner of Patents and Trademarks